United States Patent [19]

Eisen et al.

[11] Patent Number: 6,098,168

[45] Date of Patent: Aug. 1, 2000

[54] SYSTEM FOR COMPLETING INSTRUCTION OUT-OF-ORDER WHICH PERFORMS TARGET ADDRESS COMPARISONS PRIOR TO DISPATCH

[75] Inventors: Lee Evan Eisen; Michael Putrino, both of Austin, Tex.

[73] Assignee: International Business Machines Corporation, Armonk, N.Y.

[21] Appl. No.: 09/046,867

[22] Filed: Mar. 24, 1998

[51] Int. Cl.[7] .................................................. G06F 9/38
[52] U.S. Cl. .............................. 712/218; 712/14; 712/23
[58] Field of Search .................................. 712/218, 217, 712/216, 41, 42, 23

[56] References Cited

U.S. PATENT DOCUMENTS

| | | | |
|---|---|---|---|
| 5,761,474 | 6/1998 | Lesartre et al. | 712/217 |
| 5,887,161 | 3/1999 | Cheong et al. | 712/244 |
| 5,898,853 | 4/1999 | Panwar et al. | 712/216 |
| 5,944,811 | 8/1999 | Motomura | 712/215 |

OTHER PUBLICATIONS

Popescu, Val et al., *The Metaflow Architecture*, IEEE Micro, Jun. 1991, pp. 10–13 and 63–73.

Johnson, Mike, *Superscalar Microprocessor Design*, Prentice Hall, 1991, pp. 19–20.

Sohi, Gurindar, *Instruction Issue Logic for High–Performance, Interruptible, Multiple Functional Unit, Pipelined Computers*, IEEE Transactions on Computers, Vol. 39, No. 3, Mar. 1990, pp. 349–359.

*Primary Examiner*—Richard L. Ellis
*Attorney, Agent, or Firm*—Casimer K. Salys; Felsman, Bradley, Vaden, Gunter & Dillon, LLP

[57] ABSTRACT

A mechanism structured to check for instruction collisions at the Dispatch Unit rather than the Completion Unit. In processors which issue multiple commands simultaneously, a flag bit is sent to the Completion Unit and attached to the instruction in the queue that follows the other in program order if they both have the same targeted address. When the instructions from position 1 and position 2 of the instruction queue are ready to issue, the Completion Unit checks position 2 for a flag bit. If there is a bit, then the instruction in position 1 is discarded and the instruction in position 2 is written to the target address. If there is no flag bit with the instruction in position 2, the instruction in position 1 is written to the target register. This method eliminates the need to compare all the targeted addresses that are associated with the rename registers. It requires two comparisons instead of a minimum of 15 comparisons.

14 Claims, 5 Drawing Sheets

SYSTEM FOR COMPLETING INSTRUCTION OUT-OF-ORDER WHICH PERFORMS TARGET ADDRESS COMPARISONS PRIOR TO DISPATCH

BACKGROUND OF THE INVENTION

1. Technical Field

The present invention relates in general to instruction target address collisions in a microprocessor and in particular to instruction target address collisions at architected registers in a processor. Still more particularly, the present invention relates to the reduction of logic associated with target address collision detection in a dual issue, dual completion processor.

2. Description of the Related Art

Reduced instruction set computer ("RISC") processors are employed in many data processing systems and are generally characterized by high throughput of instructions. RISC processors usually operate at a high clock frequency and, because of the minimal instruction set, do so very efficiently. In addition to high clock speed, processor efficiency is improved even more by the inclusion of multiple execution units allowing the execution of two, and sometimes more, instructions per clock cycle.

Processors with the ability to execute multiple instructions per clock cycle are described as "superscalar." Superscalar processors, such as the PowerPC™ family of processors available from IBM Corporation of Armonk, N.Y., provide simultaneous dispatch of multiple instructions. Included in the processor are an Instruction Cache ("IC"), a Dispatch Unit ("DU"), an Execution Unit ("EU") and a Completion Unit ("CU"). Generally, a RISC processor is "pipelined," meaning that a second instruction is waiting to enter the execution unit as soon as the previous instruction is finished.

The Dispatch Unit then issues the instructions to the Execution Units and the Completion Unit. The Dispatch Unit has the requirement of determining if there are registers ("address") available to receive the results of the Execution Units or the instructions are not dispatched. To avoid collisions for a given register (address) location, rename registers (temporary buffers) are provided to store, or stage, results prior to transfer to the architected (physical address) register. In the PowerPC 603e™ processor, for example, five rename registers are provided for the General Purpose Registers ("GPR"), four for the Floating Point Registers ("FPR") and one each for the condition register, the link register and the count register.

The dispatch unit dispatches an instruction to one of its Execution Units and allocates a rename register for the results of that instruction. If no rename register is available, no instruction will issue. At the same time, the instruction is dispatched to the completion unit for tracking and completion purposes. Instruction results are then transferred to the architected registers from the rename registers, by the completion unit, when an instruction is retired from the completion queue.

Collision checks are done, in the prior art, as the instruction completes. If there are two instructions, back to back in the CU queue, with the same targeted architected register, the most recent instruction in the completion queue is allowed to target the register while the previous instruction is discarded. If the first instruction results were written to the common target before completion of the second instruction, the first instruction's resultant data would be overwritten by the more recent instruction's result, upon completion. If the instructions complete at the same time and have the same architected register as the target address, the instructions must be compared and the registers associated with the rename registers must be compared.

However, completion is usually time critical. The logic required to determine if the two instructions accomplish the same task but the latest instruction has the most relevant data, takes a lot of time. The logic at the Completion Unit does not know to which architected register the instruction is writing. The rename registers are known, because the instruction is not dispatched unless a rename register is open. As it is, logic must check rename 1 (Instruction 1, temporary location) register and rename 2 (Instruction 2, temporary location) register to determine the physical register at which the instructions were targeted. The look up is complicated and is done in parallel to speed up the process. Every comparison is done at the same time, which demands a large amount of processor resources.

RISC processors usually use an elaborate target collision detection scheme, in the completion unit, that is exercised at completion time when results are complete. For example, assume that the processor is a dual issue, dual completion processor with six result rename registers (rename0, rename1, etc.). The target collision detection scheme would compare the target addresses associated with each rename register to the target addresses of every other register in every combination. The target address comparison routine is shown in Table 1 below:

compare target address of:

TABLE 1

| rename0 with rename1 |
|---|
| rename0 with rename2 |
| rename0 with rename3 |
| rename0 with rename4 |
| rename0 with rename5 |
| rename1 with rename2 |
| rename1 with rename3 |
| rename1 with rename4 |
| rename1 with rename5 |
| rename2 with rename3 |
| rename2 with rename4 |
| rename2 with rename5 |
| rename3 with rename4 |
| rename3 with rename5 |
| rename4 with rename5 |

A set of mutually exclusive, signal result tags ("rtag") (in this case 6 bits in length), associated with each of the two completing instructions indicates the rename register associated with the instruction's resultant data. For example, the two completing instructions I0 and I1, where I1 follows I0 in program order, have the result tag signals I0_rtag(0), I0_rtag(1), I0_rtag(2), etc. associated with I0. I1 has the result tag signals I1_rtag(0), I1_rtag(1), I1_rtag(2), etc. associated with I1.

A target address collision is detected when the asserted tag-bit for I0 indicates a rename having the same register target address as the rename indicated by the asserted tag-bit of I1. The logic associated with this detection would resemble the following table of compares:

TABLE 2

| Collision = |
|---|
| (I0_rtag(0) & I1_rtag(1) & target0_equals_target1) \| |
| (I0_rtag(1) & I1_rtag(0) & target0_equals_target1) \| |
| (I0_rtag(0) & I1_rtag(2) & target0_equals_target2) \| |
| (I0_rtag(2) & I1_rtag(0) & target0_equals_target2) \| |
| (I0_rtag(0) & I1_rtag(3) & target0_equals_target3) \| |
| (I0_rtag(3) & I1_rtag(0) & target0_equals_target3) \| |
| (I0_rtag(0) & I1_rtag(4) & target0_equals_target4) \| |
| (I0_rtag(4) & I1_rtag(0) & target0_equals_target4) \| |
| (I0_rtag(0) & I1_rtag(5) & target0_equals_target5) \| |

TABLE 2-continued

Collision =

(I0_rtag(5) & I1_rtag(0) & target0_equals_target5) |
(I0_rtag(1) & I1_rtag(2) & target1_equals_target2) |
(I0_rtag(2) & I1_rtag(1) & target1_equals_target2) |
(I0_rtag(1) & I1_rtag(3) & target1_equals_target3) |
(I0_rtag(3) & I1_rtag(1) & target1_equals_target3) |
(I0_rtag(1) & I1_rtag(4) & target1_equals_target4) |
(I0_rtag(4) & I1_rtag(1) & target1_equals_target4) |
(I0_rtag(1) & I1_rtag(5) & target1_equals_target5) |
(I0_rtag(5) & I1_rtag(1) & target1_equals_target5) |
(I0_rtag(2) & I1_rtag(3) & target2_equals_target3) |
(I0_rtag(3) & I1_rtag(2) & target2_equals_target3) |
(I0_rtag(2) & I1_rtag(4) & target2_equals_target4) |
(I0_rtag(4) & I1_rtag(2) & target2_equals_target4) |
(I0_rtag(2) & I1_rtag(5) & target2_equals_target5) |
(I0_rtag(5) & I1_rtag(2) & target2_equals_target5) |
(I0_rtag(3) & I1_rtag(4) & target3_equals_target4) |
(I0_rtag(4) & I1_rtag(3) & target3_equals_target4) |
(I0_rtag(3) & I1_rtag(5) & target3_equals_target5) |
(I0_rtag(5) & I1_rtag(3) & target3_equals_target5) |
(I0_rtag(4) & I1_rtag(5) & target4_equals_target5) |
(I0_rtag(5) & I1_rtag(4) & target4_equals_target5) |

In the above logic equation, the symbol "&" indicates the logical-AND function, the symbol "|" indicates the logical-OR function, and the symbol "=" indicates a signal assignment. It can be seen that the amount of logic associated with collision detection is large and can require a prohibitive amount of delay depending on which half-cycle the architected register file is written.

In FIG. 3, a simplified block diagram of a superscalar processor is depicted. Instructions are fetched from the instruction queue 302 and placed in the instruction queue of the dispatch unit 304. The instruction queue is a multi-entry queue and instructions enter the queue in the top position. The instructions step down in position as previous instructions are issued. Since the processor is capable of issuing two instructions per cycle, instructions are issued through position 1 and 0 of the instruction queue 306.

Instruction dispatch is done, by the dispatch unit 304, in program order. The instructions are dispatched, at the same time, to their respective execution units 308 and 310, and the completion unit 306. As in the dispatch unit 304, the instructions enter the Completion Unit 306 queue in the top position and step down as instructions are issued. The Completion Unit 306 provides a mechanism for tracking instructions from dispatch through execution.

The Execution Units 308 and 310, compute the instructions and send the results to previously assigned rename registers 312 and 314 in preparation for writing the results to the target address. Comparisons of the targeted addresses 316 and 318 that are associated with the rename registers 312 and 314 are made after the Execution Units 308 and 310 transfer the results to the rename registers 312 and 314.

FIG. 4 depicts the prior method of determining target address collisions. Considering FIG. 4 with FIG. 3, the process begins with step 400, which illustrates the Dispatch Unit receiving two instructions from the instruction cache. The process passes to step 402, which depicts the Dispatch Unit 304 determining if there are rename registers available for both instructions. If not, the process then proceeds to step 404 which illustrates the Dispatch Unit 304 holding the instructions until there are available rename registers. If there are rename registers available, the process proceeds instead to step 406 which depicts the Dispatch Unit 304 issuing both instructions to the respective Execution Units 308 and 310, and the Completion Unit 306.

The process then proceeds to step 408, which depicts the instructions being placed into the Completion Unit 306 instruction queue. The instruction queue is a First In First Out buffer and the instructions are always issued from the first and second positions (positions 0 and 1). The process then passes to step 410, which illustrates the Completion Unit checking to see if instruction I0 has completed. If not, the process repeats step 410 and I0 is held in the Completion Unit 306 until I0 is complete. If I0 is complete, the process proceeds instead to step 416, which illustrates the Completion Unit 306 checking to see if the respective Execution Unit 310 has completed I1. If not, the process then passes to step 413 which illustrates the completion unit 306 writing back I0 to the targeted address. The process proceeds to step 414 which depicts the Completion Unit 306 checking to see if I1 has completed. If I1 has completed, the process continues to step 415 which depicts the Completion Unit 306 writing I1 to its target address.

If the Completion Unit 306 determines that the Execution Unit 308 or 310 has completed I1, the process instead proceeds to step 418, which illustrates the Completion Unit 306 comparing the target addresses associated with the rename registers 312 and 314 in which instructions I1 and I0 are located, and determining if the architected registers 316 and 318 are the same. The process then passes to step 420 which depicts the Completion Unit 306 checking to see if I1 and I0 have the same address. If the addresses are not the same, the process then proceeds to step 421 which illustrates the Completion Unit writing I0 and I1 to the instructions' respective addresses. If the addresses are the same, the process proceeds instead to step 422 which depicts the Completion Unit writing back I1 to the target address and discarding I0. Based on the number of architected registers associated with the rename registers 312 and 314, there can be 15 comparisons made, just to determine if the results from I0 and I1 are to be written to the same architected register.

The logic, as discussed previously, requires the comparison of all the possible target addresses available to the rename registers, in order to avoid any target address collisions. Results and operation of the Completion Unit 306 are held up until the comparisons are made. Only then are the results written to the targeted address. The current process of comparing target architected addresses, at the end of the execution of instructions, consumes a lot of processor resources. In order to reduce the time calculating the comparisons, the logic is handled in parallel, thus increasing the need for physical resources, i.e., comparators, to handle the calculations.

It would be desirable, therefore, to provide a method and apparatus for detecting target address collisions, in a RISC processor, that would reduce the time from issuance to completion and reduce the need for extensive physical resources.

SUMMARY OF THE INVENTION

It is therefore one object of the present invention to reduce the execution time associated with the logic required to detect target address collisions.

It is another object of the present invention to reduce the physical resources on the processor needed to detect target address collisions.

The foregoing objects are achieved as is now described. Since the dispatch unit knows the targeted address (architected address) of each instruction it issues, logic is structured to check for instruction collisions at the dispatch unit rather than the Completion Unit as is now done. When a dispatch unit issues two instructions simultaneously, a flag bit is sent to the Completion Unit instruction queue and attached to the later instruction. The instruction queue, a First In First Out buffer, issues instructions in program order. When the instructions from position 1 and position 2 of the Completion Unit instruction queue are ready to issue, the logic checks position 2 for a flag bit. If there is a flag bit, then the instruction in position 1 is discarded and the instruction in position 2 is written to the target address. If there is no flag bit with the instruction in position 2, the instruction in position 1 is written to the target register. This method eliminates the need to compare all the targeted addresses that are associated with the rename registers. It requires two comparisons instead of a minimum of 15 comparisons.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
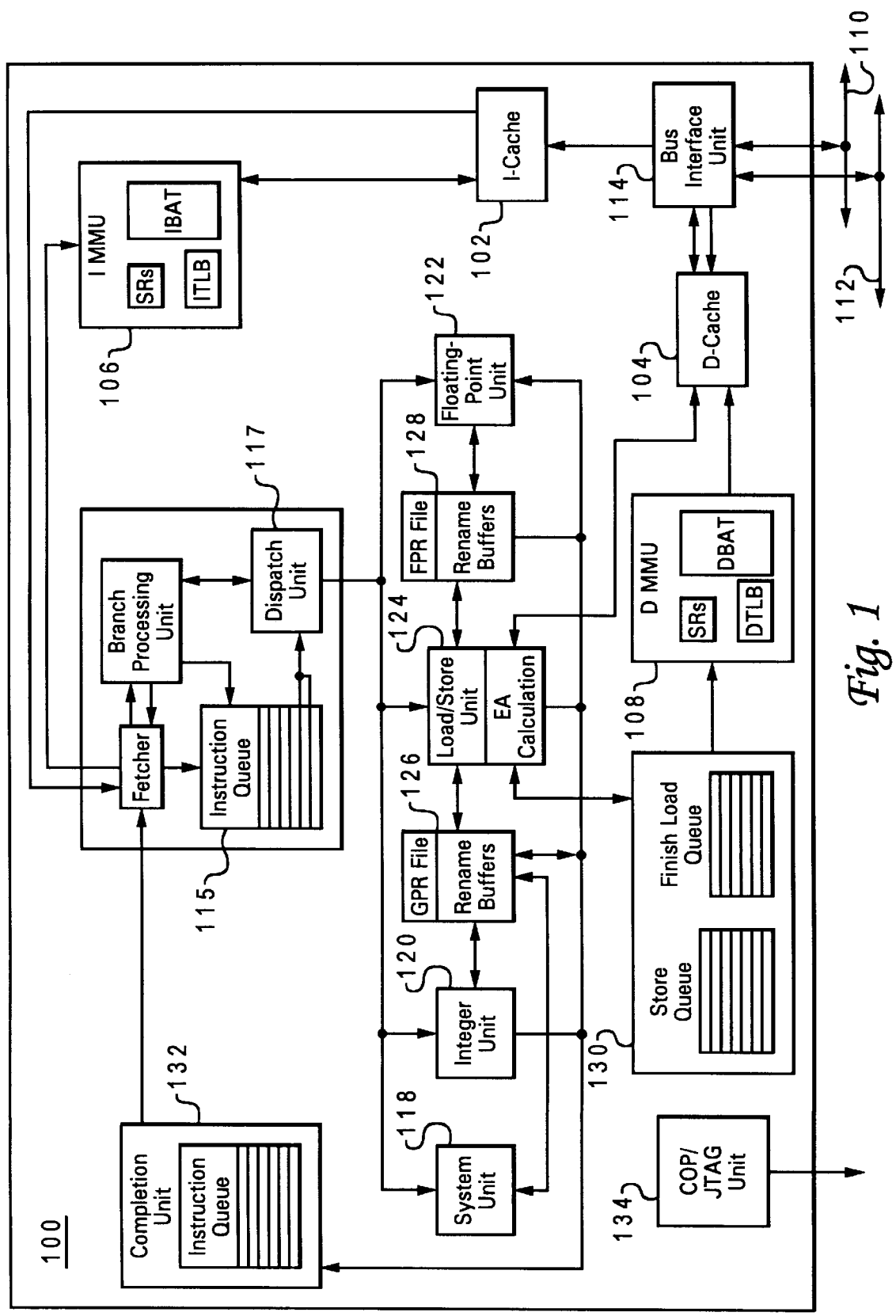
FIG. 1 depicts a block diagram of a RISC processor and related portions of a data processing system in which a preferred embodiment of the present invention may be implemented.

With reference now to the figures, and in particular with reference to FIG. 1, a block diagram of a processor and related portions of a data processing system in which a preferred embodiment of the present invention may be implemented are depicted. Processor 100 is a single integrated circuit, superscalar processor, such as the PowerPC™ processor available from IBM Corporation of Armonk, N.Y. Accordingly, processor 100 includes various units, registers, buffers, memories, and other sections, all of which are formed by integrated circuitry. Processor 100 also operates according to reduced instruction set computing ("RISC") techniques.

Processor 100 includes level one (L1) instruction and data caches ("I Cache" and "D Cache") 102 and 104, respectively, each having an associated memory management unit ("I MMU" and "D MMU") 106 and 108. As shown in FIG. 1, processor 100 is connected to system address bus 110 and to system data bus 112 via bus interface unit 114. Instructions are retrieved from system memory (not shown) to processor 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue 115 and a dispatch unit 117.

The dispatch unit 117 within instruction unit 116 dispatches instructions as appropriate to execution units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128.

Load/store unit 124 loads instruction operands from data cache 104 into integer or floating point registers 126 or 128 as needed, and stores instruction results when available from integer or floating point registers 126 or 128 into data cache 104. Load and store queues 130 are utilized for these transfers from data cache 104 to and from integer or floating point registers 126 or 128. Completion unit 132, which includes reorder buffers and instruction queue, operates in conjunction with instruction unit 116 to support out-of-order instruction processing, and also operates in connection with rename buffers within integer and floating point registers 126 and 128 to avoid conflict for a specific register for instruction results. Common on-chip processor ("COP") and joint test action group ("JTAG") unit 134 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. All such variations are within the spirit and scope of the present invention.

Figure 1A:
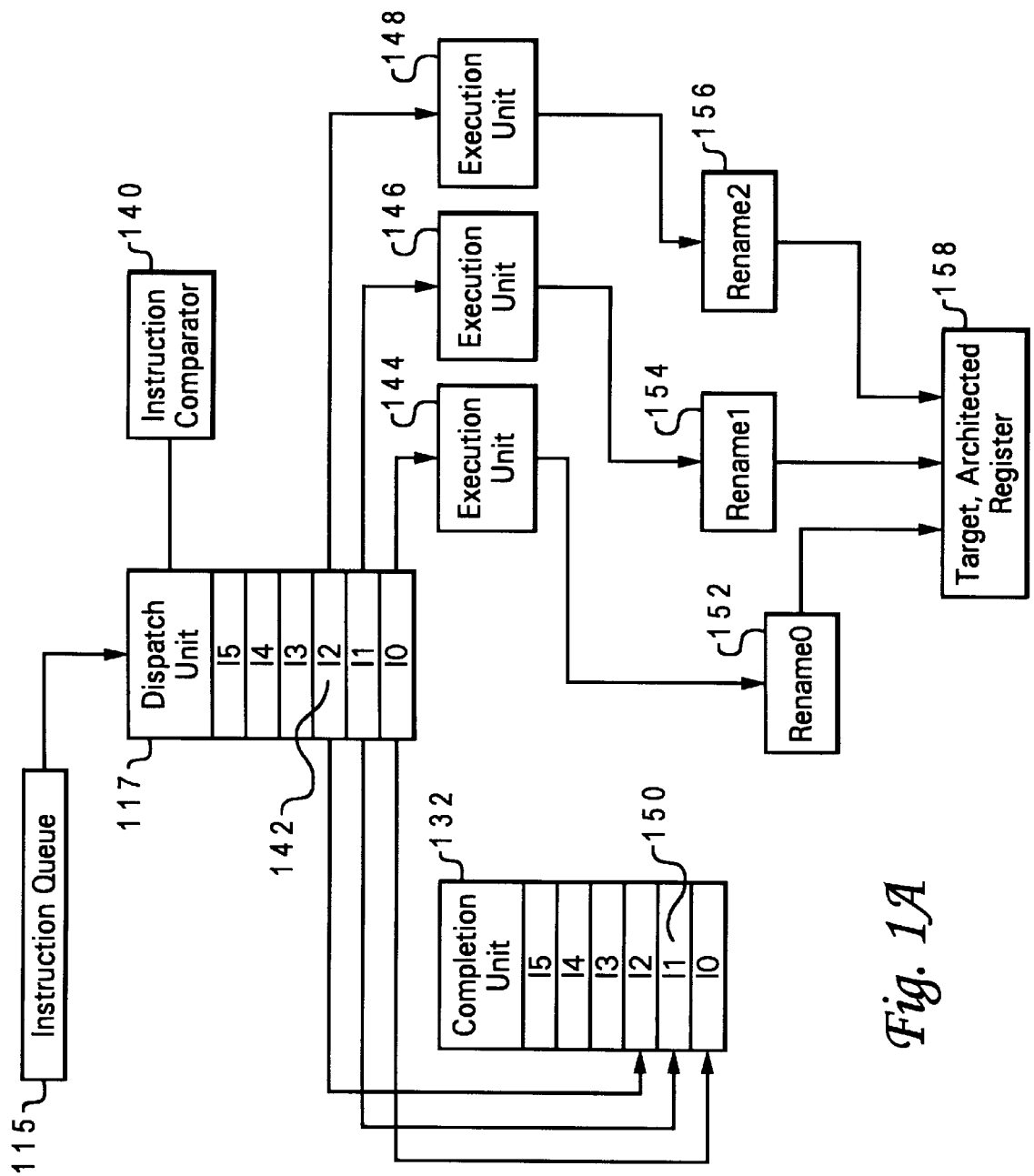
FIG. 1A is a detail of a superscalar processor, in which a preferred embodiment of the present invention may be implemented.

Referring now to FIG. 1A, a detail of a superscalar processor in which a preferred embodiment of the present invention may be implemented, is depicted. Instructions are transferred from Instruction Queue 115 and placed in instruction queue 142 of Dispatch Unit 117. Instruction Queue 142 is a multi-entry queue and instructions enter the queue in the top position. The instructions step down in position as previous instructions are dispatched by Dispatch Unit 117. Prior to issuing the instructions, Dispatch Unit 117 compares the first instruction in program order to the previously issued instruction in Instruction Comparator 140. Instructions are issued simultaneously, in program order, from the first and second position of Instruction Queue 115 to their respective execution units 144, 146 and 148. At the same time, the instructions are also dispatched to Completion Unit 132. As in the Dispatch Unit 117, the instructions enter Completion Unit 132 instruction queue in the top and step down. Completion Unit 132 provides a mechanism for tracking instructions from dispatch through execution.

Execution Units 144, 146, and 148 complete the instructions and send the results to previously assigned rename registers 152, 154 and 156 in preparation for writing the results to target address 158.

Dispatch Unit 117 uses comparator 140 to compare, in program order, the targeted addresses of the last issued instruction and the next instruction in order. A flag bit is issued to Completion Unit 132, to the following instruction if targeted address 158 is the same.

Figure 2:
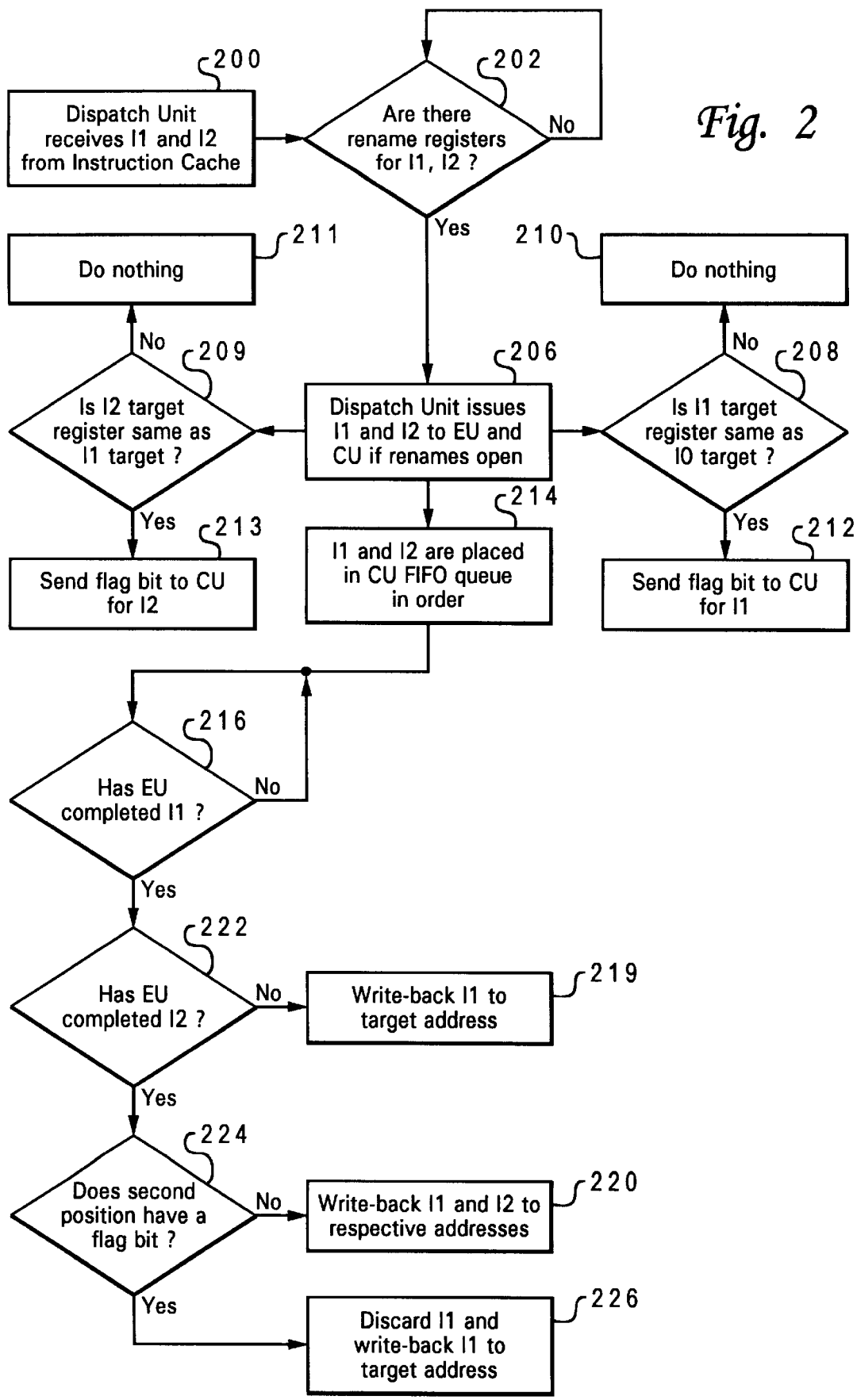
FIG. 2 depicts a high level flow chart for a process of determining whether a common target address is employed for two instructions in accordance with a preferred embodiment of the present invention.
Figure 3:
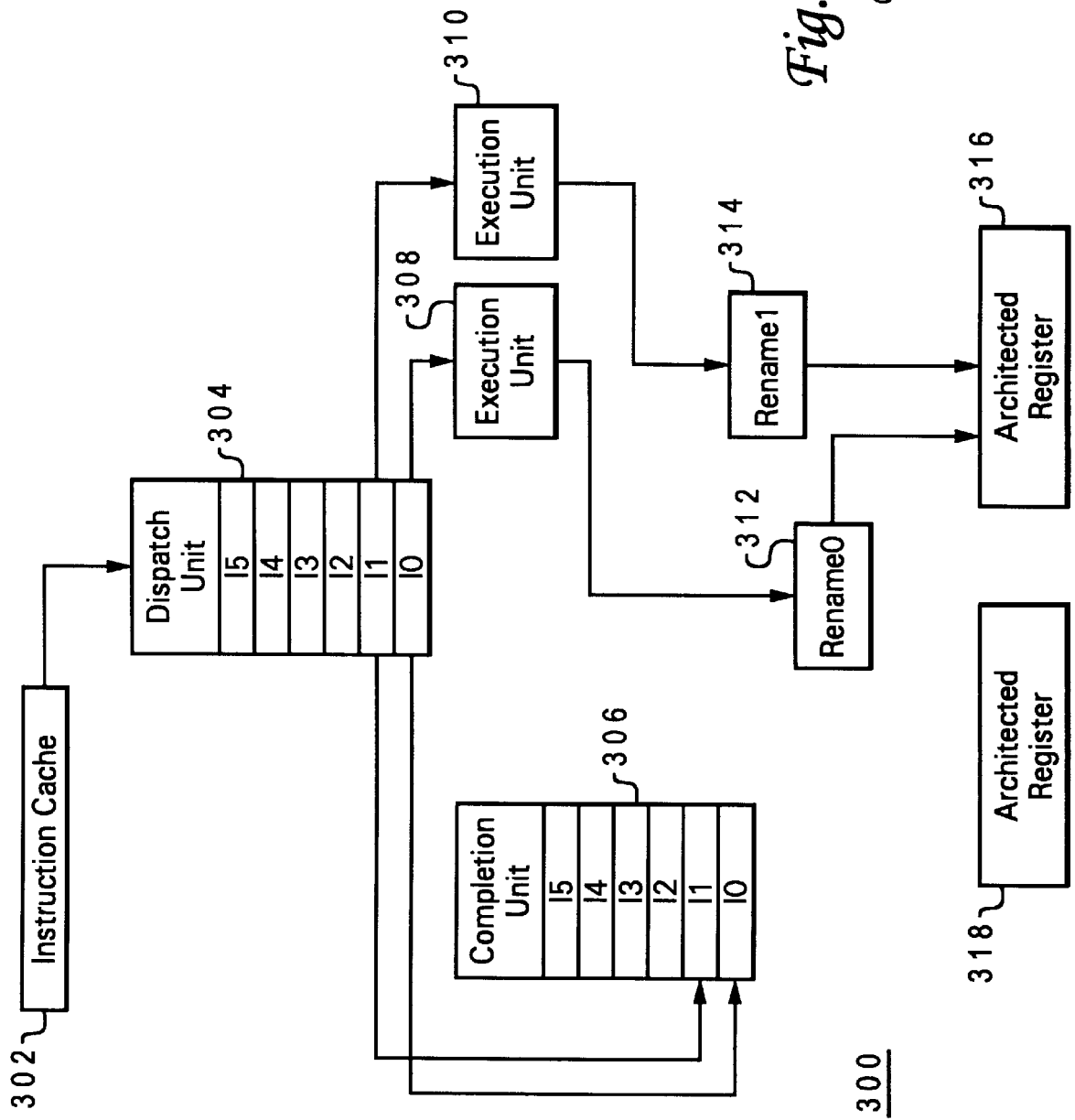
FIG. 3 is a detail of a superscalar processor in accordance with the known art.
Figure 4:
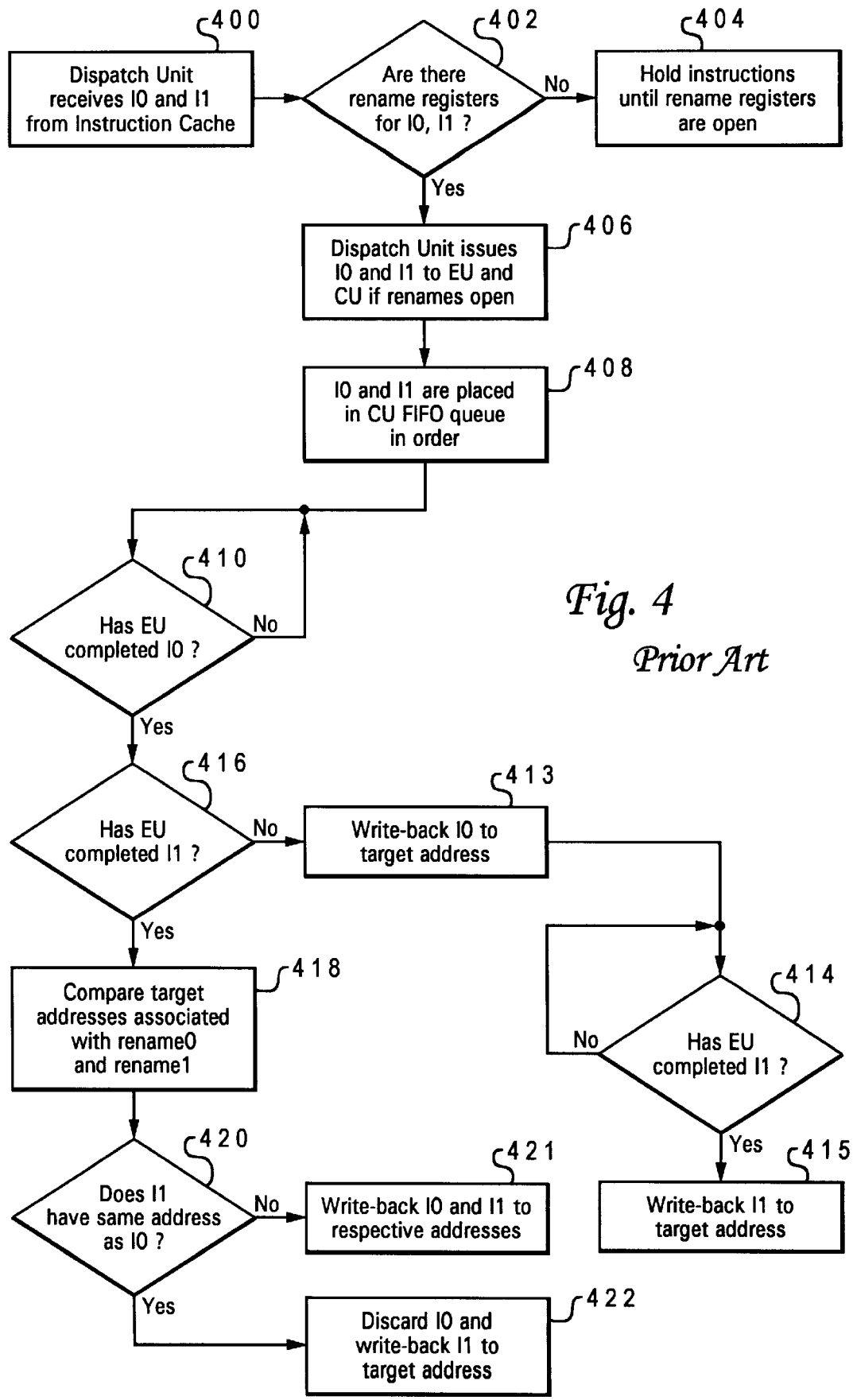
FIG. 4 depicts a high level flow chart for a process of detecting target address collisions in accordance with the known art.

Referring to FIG. 2, a high level flow chart depicts a process of determining whether a common target address is employed for two instructions in accordance with a preferred embodiment of the present invention. Considering FIG. 2 together with FIG. 1a, the process begins at step 200, which depicts Dispatch Unit 117 receiving Instruction 1 ("I1") and Instruction 2 ("2") from Instruction Queue 115. The process continues to step 202, which illustrates Dispatch Unit 117 determining if there are rename registers 152, 154 or 156 available to receive results from Execution Units 144, 146 and 148. If there are no rename registers available, the process repeats until rename registers are open. If there are rename registers available, the process instead proceeds to step 206, which illustrates Dispatch Unit 117 issuing both instructions, I1 and I2, to the respective Execution Units and the Completion Unit. I0 is shown having been issued from position 1 of dispatch instruction queue 142 just prior to I1. At the same time, the process also proceeds to step 208, which depicts Dispatch Unit 117 checking to see if the I1 target address is the same as the I0 target address. If the addresses are not the same, the process passes to step 210, which illustrates instructions being dispatched without further inspection. If the target addresses are the same, however, the process proceeds to step 212, which depicts the Dispatch Unit sending a flag bit to the Completion Unit to attach to instruction I1.

Concurrently, the process passes to step 209, which depicts Dispatch Unit 117, checking to see if the I2 target address is the same as the I1 target address. If the addresses are not the same the process passes to step 211 which illustrates instructions being dispatched without further instpection. If the target addresses are the same, however, the process proceeds instead to step 213, which depicts Dispatch Unit 117 sending a flag bit to Completion Unit 132 to attach to instruction I2.

Referring again to step 206, at the same time as the process proceeds to step 208 and 209, the process also passes to step 214, which illustrates instructions I1 and I2 being placed into Completion Unit 132 instruction queue. The instructions are placed there in program order and are tracked by Completion Unit 132 as they are completed. In the exemplary embodiment, I2 at this point has a flag bit and has entered the queue behind I1, which was immediately preceded, in program order, by I0. Both instructions step down the queue until they reach position 1 and position 2, respectively.

At this point the process proceeds to step 216, which depicts Completion Unit 132 checking to see if I1 is complete. If I1 has not completed, the process repeats until Execution Unit 146 signals I1 is complete. If Execution Unit 146 has completed I1, the process passes to step 222, which illustrates checking to determine whether Execution Unit 146 has completed I2. If I2 has not completed, then the process proceeds to step 219, which depicts writing I1 to target address 158. If Execution Unit 148 has completed I2, the process instead proceeds to step 224, which illustrates checking position 2 in Completion Unit 132 instruction queue for a flag bit. If there is no flag bit, the process passes to step 220 which depicts writing I1 and I2 to the respective addresses. If there is a flag bit indicated in position 2, the process proceeds instead to step 226, which depicts discarding I1 and writing I2 to targeted address 158.

The present invention avoids the time consuming comparison logic that takes place at the end of execution of the conflicting instructions. Instead, the determination of the priority of the instruction is determined by the Completion Unit checking position 2 to determine if a flag bit is set in association with the instruction in that position. If not, the instruction in position 1 is written to the targeted register. If there is a flag bit, the instruction in position 2 is written and the instruction in position 1 is discarded. An additional bit, added at the Dispatch Unit after comparing one instruction to a preceding instruction, reduces both logic calculations and decreases the need for physical resources. The number of comparisons have been reduced from 15 to one and the use of physical resources has been reduced to one comparator.

While the invention has been particularly shown and described with reference to a preferred embodiment, it will be understood by those skilled in the art that various changes in form and detail may be made therein without departing from the spirit and scope of the invention.

What is claimed is:

1. A method for determining target address collisions between simultaneously completing instructions, including:

comparing the target address of an instruction to the target address of a previous instruction, prior to dispatching the instruction to an execution unit and a completion unit instruction queue;

responsive to determining the target address of the instruction matching the target address of the previous instruction and setting a flag bit associated with the instruction in the completion unit;

checking a flag bit associated with a predetermined position of the completion unit instruction queue; and responsive to determining whether the flag bit associated with the predetermined position is set, writing a result of the instruction to an address corresponding to the target address of the instruction.

2. The method of claim 1, further comprising:

responsive to the previous instruction completing prior to the completion of the instruction, writing the result of the previous instruction to the address corresponding to the target address of the instruction; and writing the result of the instruction over the result of the previous instruction in the address, upon completion of the instruction.

3. The method of claim 1, wherein the step of comparing the target address of an instruction to the target address of a previous intruction prior to being dispatched to an execution unit and a completion unit instruction queue, further comprising;

comparing the target address of a following instruction to the target address of the instruction;

responsive to determining that the target address of the following instruction matches the target address of the instruction, adding a flag bit associated with the following instruction in the completion queue.

4. The method of claim 1, further comprising:

responsive to the instruction completing before the previous instruction;

writing a result of the instruction to the target address; and discarding a result of the previous instruction.

5. The method of claim 3, further comprising:

determining the status of a flag bit associated with a predetermined position;

writing a result of an instruction, in the predetermined position, to the target address; and discarding a result of an instruction in the preceding position.

6. The method of claim 5, further comprising:

responsive to determining that the flag bit in a predetermined position is not set, writing a result of the instruction in the predetermined position and a result of the previous instruction to the respective addresses of each instruction.

7. The method of claim 5, wherein the step of checking a predetermined position of the completion unit instruction queue, further comprises;

checking the second position of the completion unit instruction queue.

8. A mechanism for determining target address collisions between simultaneously completing instructions, comprising:

means for comparing the target address of an instruction to the target address of a previous instruction prior to dispatching the instruction to an execution unit and a completion unit instruction queue;

means, responsive to determining that the target address of the instruction matches the target address of the previous instruction, for setting a flag bit associated with the instruction in the completion unit;

means for checking a flag bit associated with a predetermined position of the completion unit instruction queue; and means, responsive to determining that the flag bit associated with the predetermined position is set, for writing a result of the instruction to an address corresponding to the target address of the instruction.

9. The mechanism of claim 8, further comprising:

means responsive to the previous instruction completing prior to the completion of the instruction;

for writing the result of the previous instruction to the address corresponding to the target address of the instruction; and for writing the result of the instruction over the result of the previous instruction in the target address, upon completion of the instruction.

10. The mechanism of claim 8, wherein the means for comparing the target address of an instruction to the target address of a previous intruction prior to being dispatched to an execution unit and a completion unit instruction queue, further comprises;

means for comparing the target address of a following instruction to the target address of the instruction; and means, responsive to determining that the target address of the following instruction matches the target address of the instruction, for adding a flag bit associated with the following instruction in the completion queue.

11. The means of claim 8, further comprising:

means responsive to the instruction completing prior to the previous instruction;

for writing a result of the instruction to the target address; and for discarding a result of the previous instruction.

12. The means of claim 10, further comprising:

means, responsive to determining the status of a flag bit associated with a predetermined position, or writing a result of an instruction in the predetermined position to the target address, and for discarding a result of an instruction in the preceding position.

13. The means of claim 12, further comprising:

means, responsive to determining that the flag bit in a predetermined position is not set, for writing a result of the instruction in the predetermined position and a result of the previous instruction to the respective addresses of each instruction.

14. The means of claim 12, wherein means for checking a predetermined position of the completion unit instruction queue, further comprises;

means for checking the second position of the completion unit instruction queue.

* * * * *